L. R. HUFF.
PRESSURE REGULATOR FOR TURBOCOMPRESSORS.
APPLICATION FILED FEB. 19, 1921.
1,415,647.
Patented May 9, 1922.
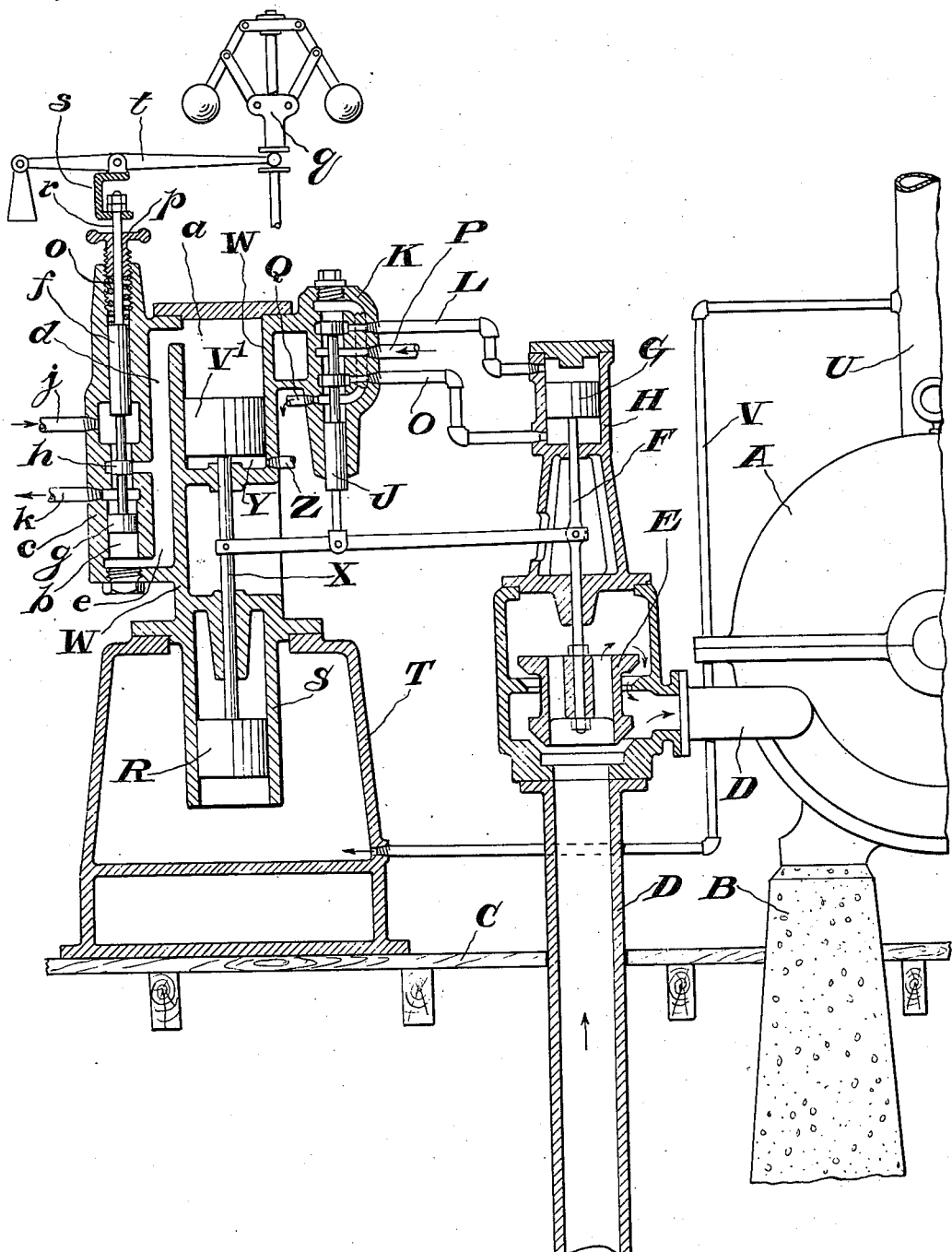

UNITED STATES PATENT OFFICE.

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY.

PRESSURE REGULATOR FOR TURBOCOMPRESSORS.

1,415,647.   Specification of Letters Patent.   Patented May 9, 1922.

Application filed February 19, 1921. Serial No. 446,388.

*To all whom it may concern:*

Be it known that I, LESLIE R. HUFF, a citizen of the United States, and a resident of Phillipsburg, county of Warren, and State of New Jersey, have invented a certain Pressure Regulator for Turbocompressors, of which the following is a specification accompanied by drawing.

This invention relates to a pressure regulator for a turbocompressor, but more particularly to a type of regulator in which the movable regulating member is in the form of a differential fluid actuated member, the movement of which, by means of suitable operative connections, controls the admission valve of the motor driving the compressor, thus controlling the speed of the machine and maintaining substantially constant discharge pressure for such industrial applications as Bessemer converters, pneumatic tools, manufacturing shops and like uses.

The objects of the invention are to stabilize the regulator and enable the thrust of the movable regulating member to be compensated for by a fluid pressure device in which the pressure is automatically maintained substantially constant. Another object of the invention is to prevent overspeeding of the machine.

To these and other ends, which will hereinafter appear, the invention consists of the combinations of elements substantially as hereinafter fully described and claimed in this specification and shown in the accompanying drawing, which is a diagrammatic longitudinal sectional elevation of the apparatus embodying the invention.

Referring to the drawing, a turbocompressor A viewed from the steam end is mounted on the foundations B, the floor line being indicated at C. Steam is admitted to the motor from the supply pipe D controlled by the admission valve E of any suitable type, having the valve rod F provided with the piston G in the cylinder H, although any other suitable means may be provided for actuating the admission valve E.

The valve piston G is preferably controlled by means of a pilot valve J operating in the valve casing K and controlling the conduits L and O between the valve casing K and the cylinder H. Oil or other motive fluid is admitted to the valve casing K through the supply pipe P and discharged through the pipe Q.

A movable fluid pressure regulating member, preferably in the form of a piston R operating in a pressure regulating cylinder S within the supporting casing T, is subjected to the pressure in the discharge line U of the compressor by means of a pipe V connecting the said discharge line with the casing T. A fluid pressure thrust compensating device, preferably in the form of a piston V' operating in the compensating cylinder W is connected to the valve rod X of the main regulating piston R and moves with said piston. The space Y beneath the compensating piston V' is preferably open to the atmosphere in the pipe Z which also forms a drain and the main piston R and compensating piston V' are preferably constructed with differential pressure areas, the compensating piston V' having a larger pressure area than the main piston R.

Means are provided for automatically maintaining substantially constant fluid pressure in the chamber $a$ of the compensating cylinder W and in the chamber $b$ of the pilot valve casing $c$, which latter chamber is connected to the main supply passage $d$ of the compensating cylinder by means of the passage $e$. A pilot valve $f$ operating in the valve casing $c$ is provided with the differential heads $g$ and $h$ the lower head $g$ having the larger pressure area. Oil or other fluid under pressure is supplied to the valve casing through the inlet pipe $j$, and discharged from the pipe $k$. A compression spring $o$ is preferably compressed between the pilot valve $f$ and the adjusting screw $p$, the pressure of the spring acting on the pilot valve $f$ and opposing the pressure beneath the pilot valve head $g$ in the chamber $b$.

A speed governor $q$ adapted to be connected to the engine, is operatively connected to the pilot valve stem $r$ as by means of the link $s$ and lever $t$.

In the operation of the apparatus, an increase of pressure in the discharge of the compressor will tend to move the main regulating piston R upwardly, which forces the pilot valve J upwardly from the neutral position indicated in the drawings, and permits fluid pressure to pass from the pipe P through the conduit L above the valve piston G, which tends to close the admission valve E and reduce the speed of the motor. On the other hand, a reduction of the discharge pressure will unbalance the differential piston R V' and cause it to move downward, thus pulling the pilot valve J downwardly and permitting fluid pressure to pass through the conduit O beneath the valve piston G, thus tending to further open the admission valve E and supply more steam to the engine. The pressure in the cylinder chamber $a$ and in the chamber $b$ of the valve casing $c$ is automatically maintained substantially constant because a reduction of pressure in the spaces $a$ and $b$ will permit the pilot valve $f$ to move downwardly, thus admitting fluid pressure above the compensating piston V'. An increase of pressure in the spaces $a$ and $b$ will cause the pilot valve $f$ to move upwardly thus relieving the pressure in the compensating cylinder through the discharge pipe $k$ connected to the valve casing $c$. Over-speeding of the engine is prevented by the governor $q$ which automatically moves the pilot valve $f$ in the proper direction when maximum speed is reached to unbalance the differential regulator R V' and cause movement of the steam admission valve E to increase or decrease the power supplied to the engine, as desired. Upon return of the engine to normal speed, the pilot valve $f$ again assumes neutral position as indicated in the drawing maintaining substantially constant pressure in the compensating cylinder.

I claim:

1. A pressure regulator for a motor driven turbocompressor, comprising a movable fluid pressure regulating member subject to the pressure in the discharge of the compressor and operatively connected to control the power supplied to the motor, a fluid pressure thrust compensating device connected to the said movable regulating member and means for automatically maintaining substantially constant pressure in said compensating device.

2. A pressure regulator for a motor driven turbocompressor, comprising a movable fluid pressure regulating member subject to the pressure in the discharge of the compressor and operatively connected to control the power supplied to the motor, a fluid pressure thrust compensating device connected to the said movable regulating member, means for automatically maintaining substantially constant pressure in said compensating device, and a speed governor connected to additionally control said compensating device.

3. A pressure regulator for a motor driven turbocompressor, comprising a fluid pressure regulating cylinder having a main piston subject to the pressure in the discharge of the compressor and operatively connected to control the power delivered to the motor, a thrust compensating cylinder having a piston connected to said main piston, and means for automatically maintaining substantially constant pressure in said compensating cylinder opposing the pressure in the pressure regulating cylinder.

4. A pressure regulator for a motor driven turbocompressor, comprising a fluid pressure regulating cylinder having a main piston subject to the pressure in the discharge of the compressor, and operatively connected to control the power delivered to the motor, a thrust compensating cylinder having a piston of larger pressure area than the main piston and connected to the said main piston, and means for automatically maintaining substantially constant pressure in said compensating cylinder opposing the pressure in the pressure regulating cylinder.

5. A pressure regulator for a motor driven turbocompressor, comprising a fluid pressure regulating cylinder having a main piston subject to the pressure in the discharge of the compressor, and operatively connected to control the power delivered to the motor, a thrust compensating cylinder having a piston of larger pressure area than the main piston and connected to the said main piston, connections for supplying fluid under pressure to said compensating cylinder and for relieving the pressure in said compensating cylinder, and a compensating pilot valve for automatically controlling said connections.

6. A pressure regulator for a motor driven turbocompressor, comprising a fluid pressure regulating cylinder having a main piston subject to the pressure in the discharge of the compressor, and operatively connected to control the power delivered to the motor, a thrust compensating cylinder having a piston of larger pressure area than the main piston and connected to the said main piston, connections for supplying fluid under pressure to said compensating cylinder and for relieving the pressure in said compensating cylinder, and a compensating differential pilot valve for automatically controlling the said connections.

7. A pressure regulator for a motor driven turbocompressor, comprising a fluid pressure regulating cylinder having a main piston subject to the pressure in the discharge of the compressor, and operatively connected to control the power delivered to the motor, a thrust compensating cylinder having a piston of larger pressure area than the main piston and connected to the said main piston, connections for supplying fluid under pressure to said compensating cylinder and for relieving the pressure in said compensating cylinder, a compensating pilot valve for automatically controlling said connections, and a speed governor connected to said pilot valve.

8. A pressure regulator for a motor driven turbocompressor, comprising a fluid pressure regulating cylinder having a main piston subject to the pressure in the discharge of the compressor, and operatively connected to control the power delivered to the motor, a thrust compensating cylinder having a piston of larger pressure area than the main piston and connected to the said main piston, connections for supplying fluid under pressure to said compensating cylinder and for relieving the pressure in said compensating cylinder, a compensating differential pilot valve for automatically controlling the said connections, and a speed governor connected to said differential pilot valve.

In testimony whereof I have signed this specification.

LESLIE R. HUFF.